Dec. 26, 1967
F. B. DOEPKER
3,360,053
FLEXIBLE ROD WEEDERS HAVING FOLDING WINGS
Filed Oct. 5, 1964
4 Sheets-Sheet 1
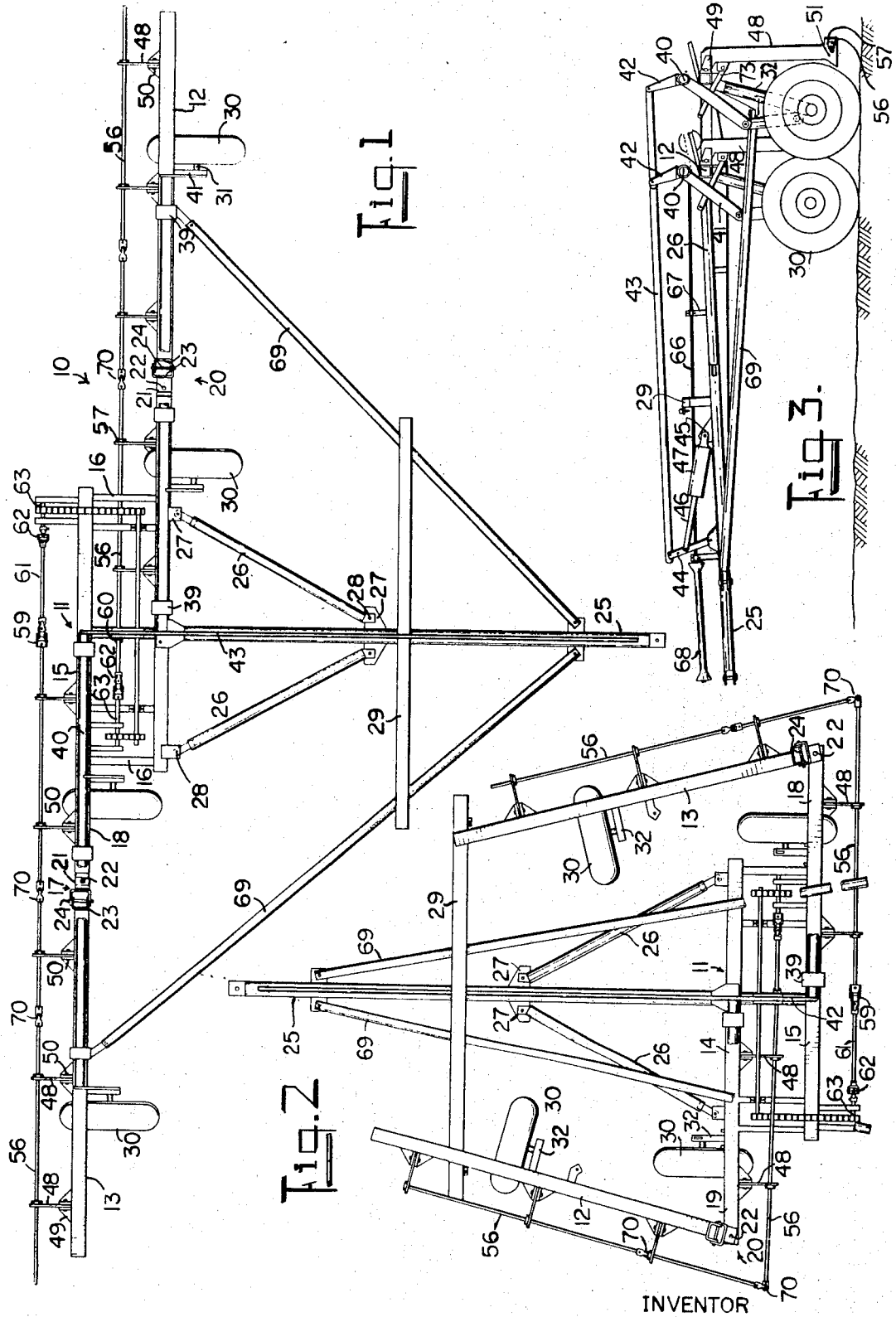
INVENTOR

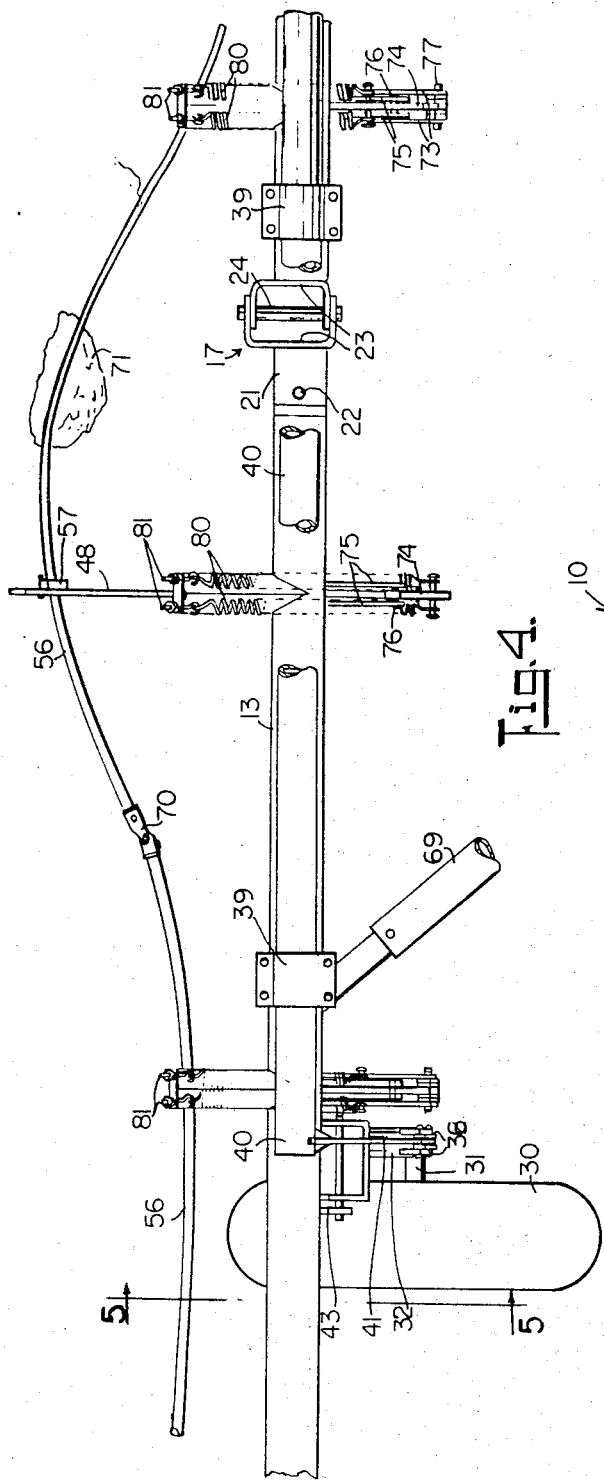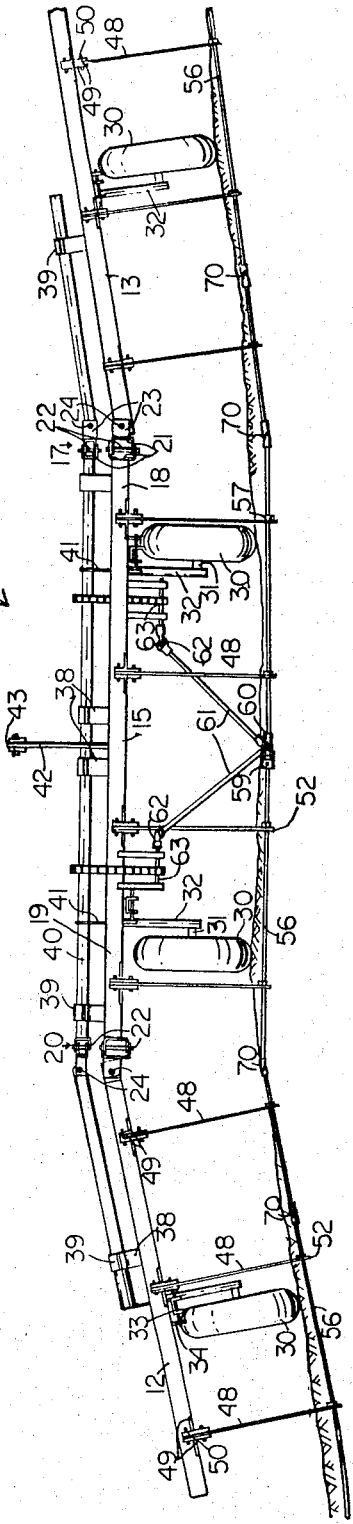
INVENTOR
FRANCIS BERNARD DOEPKER

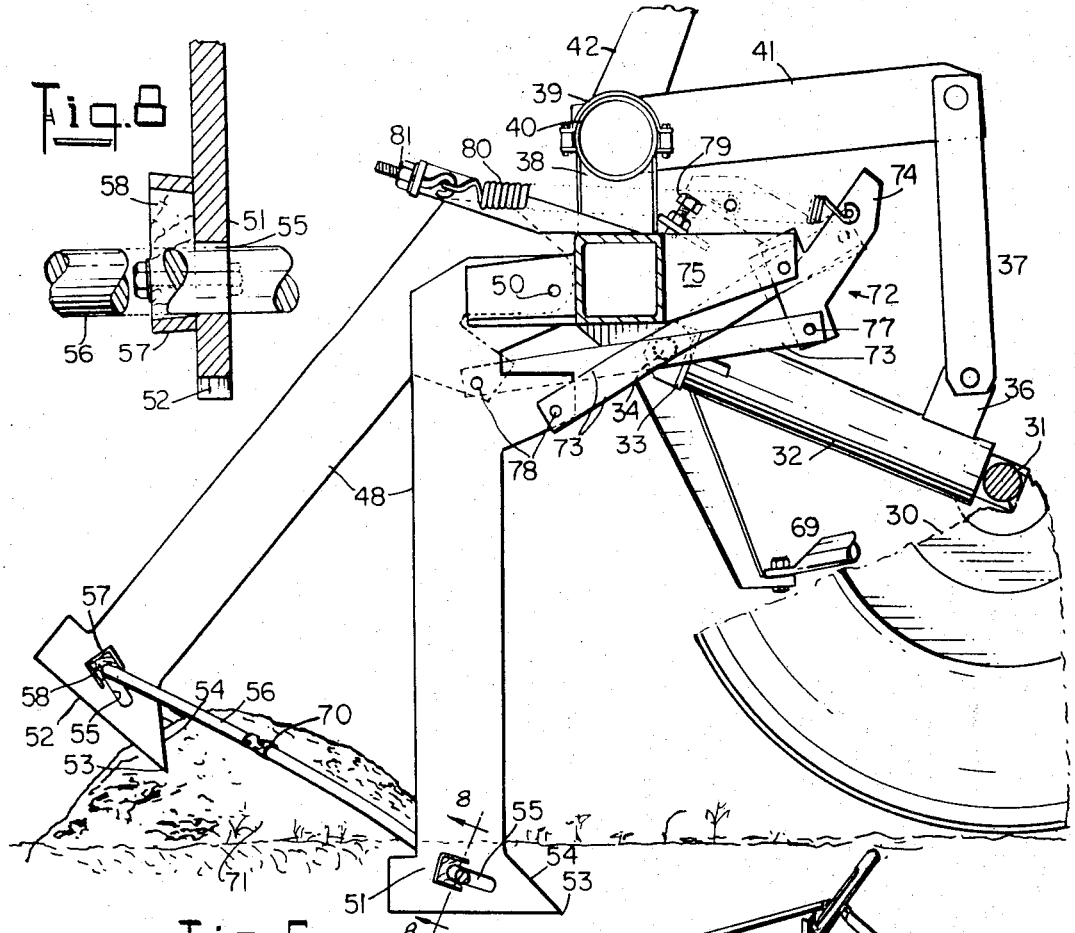
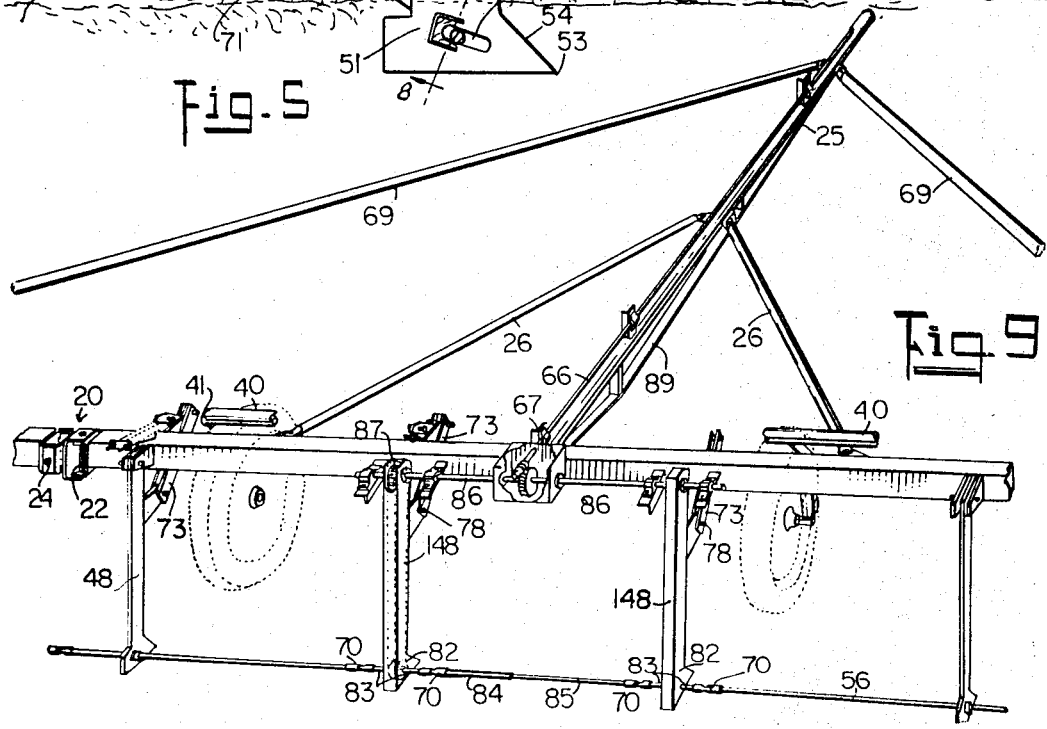

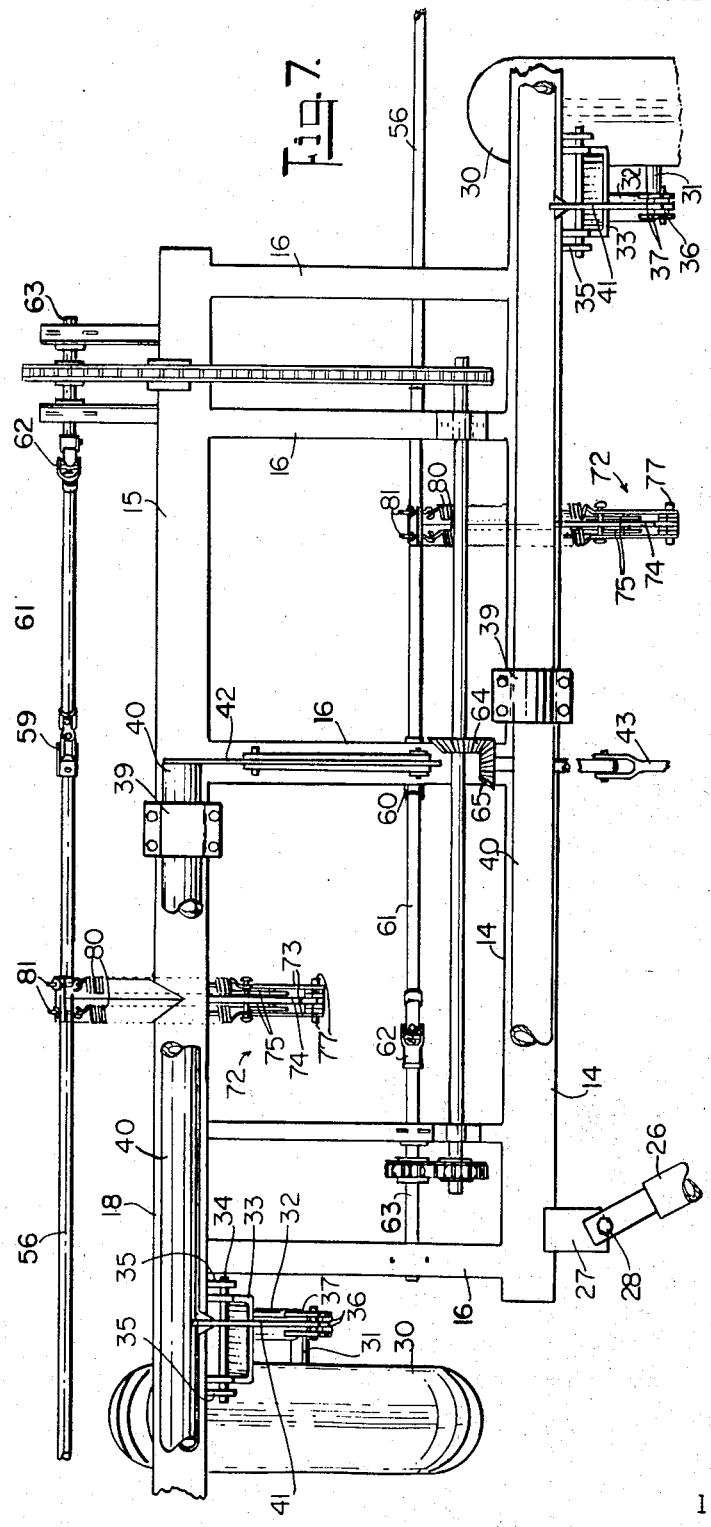

United States Patent Office 3,360,053
Patented Dec. 26, 1967

3,360,053
FLEXIBLE ROD WEEDERS HAVING
FOLDING WINGS
Francis Bernard Doepker, Annaheim,
Saskatchewan, Canada
Filed Oct. 5, 1964, Ser. No. 401,477
Claims priority, application Canada, Oct. 5, 1963,
886,092/63
8 Claims. (Cl. 172—44)

This invention relates to soil tilling implements, and particularly to very wide implements such as rotary rod weeders having articulated center and wing frame portions which allow folding to a reduced width.

In the tillage of land on a large scale a wide span of implement is desirable to enable economic agricultural operation. In particular such tillage tools as rotary rod weeders which require only moderate horsepower draft means per foot of ground covered, cannot be extended without risking very uneven penetration of the rod. In such work as rod weeding after cereal grain is seeded but before emergence of seedlings to control weeds, a very critical depth of operation is imposed. I have found that the width of tillage of a rotary rod weeder may be very greatly increased with safety, by arranging the rods in separate sections to be supported by a centerframe section, and by left and right wing frame sections which are free to tilt about horizontal longitudinal pivot axes in articulated frame joints carried on the ends of the center frame. When the horizontal pivot lies outwardly of an associated vertical pivoting joint in the end of the center frame, the wing section may be rotated either forward or backward to reduce the width of the implement, as when roading it.

The present invention therefore has as its primary objective the realization of a wide span three-section tillage implement capable of being extended in operating position to cover as much as 42 feet or more of cut, while being flexible in the sense that adjacent sections are joined by universal joint means to facilitate maintaining a critical depth adjustment of a powered sectional rotary rod carried by the implement.

It is also a principal objective for the invention to realize an economical and durable tillage implement capable of being towed as a wide-span soil-tilling tool and of being folded with the wing portions pivoting about fixed vertical pivot axes in the ends of a wheeled center frame portion.

Other objects will be made apparent upon carefully studying the following description in conjunction with the accompanying figures of the drawing, in which:

FIGURE 1 is a plan view of an extended tillage implement having a powered rotary rod in two spaced sections, the implement being foldable;

FIGURE 2 shows the implement of FIGURE 1 in folded, road position;

FIGURE 3 is a side elevation view of the implement with the rod raised;

FIGURE 4 is an enlarged plan view of the right wing frame portion of FIGURE 1, illustrating the release of a standard and articulation of the rod when encountering an obstacle;

FIGURE 5 is a side elevation view in section taken along line 5—5 of FIGURE 4, showing frame elevating and depressing means and the release means for the standards; in a large scale;

FIGURE 6 is a rear elevation view to the same scale as FIGURE 1, showing the flexing of the left and right frame sections to accommodate the implement to uneven ground;

FIGURE 7 is an enlarged plan view of a portion of the center frame of FIGURE 1 showing rod drive means and pivots for the rocking shafts;

FIGURE 8 is a section taken on line 8—8 of FIGURE 5 through the standard shoe and showing the bearing block support; and, FIGURE 9 is a perspective view of an in-line frame arrangement and a drive means comprising direct drive of the shoe type coupled to left and right rod sections.

Referring to the drawing, FIGURE 1, an implement 10 is made up of three frame sections, comprising a center frame portion 11 and left and right wing frame portions designated 12 and 13. The center frame section 11 comprises a forward frame bar 14 and a rearward bar 15 which are braced in parallel relation as a single unit by cross bars 16.

The frame bars 14 and 15 are of equal length but laterally offset with respect to each other to provide frame extensions 18 and 19 respectively projecting on opposite sides of the center frame section 11.

The laterally extending frame portion 18 of the rearward frame bar 15 is connected by a universal joint 17 with the right wing frame 13. Similarly the laterally extending front frame portion 19 is connected by a universal joint 20 with the left wing frame portion 12. As may be seen in FIGURE 1, the wing frame 12 and forward center frame bar 14 are aligned in operating position, as are also the wing frame 13 and rearward center frame bar 15.

Each of the joints 17 and 19 comprise an inboard vertical pivoting assembly 21 forming a vertical pivot about the axis of a robust pin 22. An integral horizontal pivoting assembly 23 spaced outwardly from but integrally connected with the vertical pivoting assembly provides for pivoting movement of the wing frames about horizontal longitudinal axes in robust pins 24. The center frame will be seen to be relatively fixed, and held in transversely extending position, by being joined with the drawpole 25 and braced thereto by members 26 which comprise dis-assemblable brackets 27 and bolts 28. As shown by FIGURE 2, the left and right wing frame portions may be swung forwardly about the vertical pivots through more than 90 degrees to bring their outboard ends into support positions on a transverse wing rest 29 fixed forwardly on the drawpole.

The center frame portion is carried by a pair of ground-engaging wheels 30, journalled on axles 31. Each wheel axle is fixed to the lower end of a inclined pipe strut 32 (see FIGURES 3, 4 and 5), whose upper end carries bracket 33. The bracket in turn is carried by a horizontal shaft 34 received pivotally in lugs 35 fixed forwardly and below the center frame bar extensions. The pipe strut 32 also carries, adjacent the axle 31, upstanding lugs 36 from which upwardly extend pivoting links 37. Above each laterally extending frame portion, pairs of short standoffs 38 fixed on the center frame bars support bearing sleeves 39, in which journalled the rockshaft 40. An arm 41 welded to the rockshaft and extending forwardly thereof has its outer end pivotally and preferably loosely connected with the upper end of links 37. Each rockshaft is rotatable in its supporting sleeves, as by turning the actuating arm 42 fast on the rockshaft, as will be made more directly apparent hereinafter.

The rockshafts moreover are each formed as a center section and a wing section, and are provided with universal joint means identical to the joint means connecting each center frame bar with its wing frame portion, the associated joint means being substantially in vertically superposed relation with the rockshaft above it. As can be most clearly seen by reference to FIGURES 4 and 6 each section of a rockshaft is at all times maintained substantially parallel with the associated frame bar which it overlies, despite unevenness of land which may cause a wing frame to be tilted with respect to the center frame section. The respective inboard vertical pivoting assemblies 21 have their vertical pivot pins 22 preferably in alignment. The horizontal pivoting assemblies of the rock shafts and the frame sections are also in vertical superposition.

Referring now to FIGURE 3, the actuation arm 42 is pivotally joined with a forwardly extending pull strap 43 carried above the drawpole 25. Jackshaft 44, which is pivoted on the drawpole in brackets 45 adjacent the forward end thereof, is pivotally joined by its upper end with the forward end of the pull strap 43, and is connected for actuation with the rod 46 of a linear hydraulic motor 47 connected to the drawpole. It will be seen that when the motor is actuated by suitable means (not shown), to extend or retract the rod 46, adjustably the jackshaft 44 will be swung about its lower pivoted end. Pullstrap 43 will correspondingly move ganged arms 42, thereby causing the pipe struts 32 to be more or less inclined, and thereby elevating or depressing the frame with respect to the wheel axles. Consequently, the ganging of the several wheels for common depth adjustment provides a means for selectably operating a tillage tool or group thereof connected to the frames 12, 13, and 14 at a chosen depth in accordance with the setting of the motor 47.

It will be seen that the frames support a series of erect standards 48 depending from respective pairs of brackets 49 extending rearwardly horizontally from the frames. Each bracket 49 carries a horizontal tranverse pivot pin 50 about which the standards are free to rotate when released under extreme loading. The lower end of each standard comprises a shoe 51 which, like the standard, is a relatively thin steel bar, for example having a thickness of a half inch and a breadth in the fore-and-aft direction of four inches. Each shoe has a lower heel surface 52, and a point 53 terminating a downwardly inclined forward shin 54. An elongated aperture 55 behind the shin 54 having parallel sides extends forwardly and slightly downwardly, in which a transverse weeding rod 56 of circular cross section is received. The width of the aperture is such that the rod 56 is free to rotate therein, to move along the aperture, and to incline at an angle to the perpendicular to the plane of the standard. The shoe carries a U-shaped bearing housing 57 on the rearward side only, extending about five-eighths of an inch laterally from one side of the shoe, and serving as a retainer for a bearing block 58 which occupies the rearward portion of the aperture 55. The bearing block may be any durable, cheap material such as treated wood, or a composition, and for long wear may be a material such as nylon.

Referring additionally to FIGURE 7, the rods 56 are ordinarily maintained in aligned, straight position passing through and journalling in the shoes of the standards, and project inwardly to the center of the implement. The right rod section terminates inwardly in an angle-to-rod flexible coupling 59 which in operation is buried in the upper soil layers. Similarly, the left rod section terminates in an angle-to-rod flexible coupling 60, which is spaced in the towing direction about two feet forwardly of the rear rod section to prevent clogging by plant growth.

Each of the rods is driven by an inclined shaft 61 whose upper ends are connected to drive-to-angle flexible couplings 62 driven by respective horizontal and ganged drive shafts 63. The drive shafts receive drive through a bevel gear and pinion driving means 64, 65, the latter being driven by a line shaft 66 supported in stand-off brackets 67. A telescoping shaft 68 adapted to be connected with a source of power, preferably the power take-off, is flexibly connected with the forward end of the line shaft.

When the implement is operating in uneven ground, as shown by FIGURE 6, the wheels 30 of the center frame portion 11 establish the inclination of the drive members with respect to the ground, and control the depth of the standards 48 for this portion. In a thirty-foot rod weeder the front and rear frame bars each carry two standards when spaced three feet apart and arranged symmetrically with respect to the center line of the implement. The wing frame portions are controlled in attitude by the elevation of the outboard ends of the front and rear frame bars 14 and 15, and by the land elevation at the ground contact areas of the wheels 30 supporting the wing frames. It is to be noted that the latter wheels are positioned slightly more than half the length of the wing frame bar from the joints 17 or 20.

The loose holding of the rod sections in shoe slots 55 provides a great freedom of adjustment and adaptation for the rod 56 in all conditions of operation. In the event that a wing frame is tilted about its associated horizontal pins 24, in which the wing frames are held by the pull tube 69 which connects the wing frame with the forward portion of the drawpole restricts the tilting motion to a vertical plane. The flexible couplings 70 which connect the rod sections beneath the frame joints may be freely displaced toward a standard, in either direction to accommodate the tilting. When the implement is in operating position with the wing frames extended as shown by FIGURES 1 and 6, a universal joint 70 is disposed generally beneath but slightly to the rear of each of the joints 17 and 20. When the implement is folded as shown in FIGURE 2 the outer portion of each rod slides in its supporting standards. It will be seen from the drawing that each section of the weeding rod 56 has a length between the joints, of twice the spacing of the standards, except when the section lies between two other sections that are themselves supported in a pair of standards. As depicted, each weeding rod comprises four end-to-end universal-joint connected sections, three of which engage the soil when in operation and a fourth section constituting a drive transfer rod, 61. The couplings 59 between a drive rod 61 and the working sections of the rearward wing frame is disposed in tracking relation with the coupling 60 for the other wing frame. When a stone 71 opposes the forward motion of the rod, the latter may bend a considerable amount, while transferring loading to the standard release assembly 72. The latter comprises a linkage 73, best seen in FIGURE 5, which connect the standard with a trip dog 74 pivoted in forwardly extending frame brackets 75 about pin 76. The pin 77 joining the linkage with the trip dog is ordinarly aligned nearly in the same line with the pivot 76 and the pivot 78, but providing an offset so that pivot 76 is slightly above the line joining pivot pin centers 77 and 78. The trip dog 74 is maintained seated on adjusting bolt 79 by springs 80, whose rearward ends 81 terminate as threaded eye bolts. The adjustment of the spring tension and the offset distance by advancing or retracting bolt 79 determines what torque will suffice to cause the standard to be swung backward; the arrangement, which is well known per se, is of the sort which once released, allows the standard to swing further with decreasing torque and which rapidly returns the standard when the obstacle has been cleared.

Referring to FIGURE 9, the longitudinal offsetting of left and right rod sections is not required where the nature of tillage will tolerate the ridging due to drive boots. In the alternative implement, the center frame section comprises aligned left and right extensions 18 and 19 which are integral with each other and also connected to the drawpole 25 and braced by the bracing members 26. In this embodiment the left and right rods are driven from drive boots 82 in which the drive rods 83 are journalled. Ground rod couplings 70 connect the stub rods 83 with the rod sections. That portion of the ground rod lying between the drive boots 82 comprises a telescopably fitted pipe 84 and rod 85, which are free to move axially and to rotate relatively to each other. This is to provide that when a standard 148 is tripped, the ganged drive through shafts 86 will not impose twist on the ground rod between the standards. The latter are pivoted on their upper sprocket 87 axes, coaxial with shafts 86 which journal in bearings 88. One suitable drive arrangement shown comprises a worm and gear of suitable hand to drive the rod so that the lower surface turns in the direction of advance.

When the standards have considerable height, as shown, to prevent clogging in heavy weed growth, the torque developed on the drawpole tends to bow it downward; the stiffening strap 89 secured under the drawpole and offset therefrom is provided to give greater beam depth to the drawpole.

While specific embodiments have been herein described, it is to be understood that the invention is not limited to these and may be varied considerably in proportions and arrangements, without departing from the principles of the invention, whose scope is defined only by the appended claims. It is entirely feasible, for instance, to employ a single drive boot rather than two, where the span of the implement is such as to not warrant the use of two drive boots.

I claim:

1. In a rotary rod weeder made up of center and wing sections, a center frame section comprising front and rear frame bars and longitudinal cross bars connecting the front and rear bars as a braced unit, a ground wheel supporting each of said front and rear frame bars, a wing section frame bar connected by a universal coupling joint in extending relation to each of said front and rear bars, a ground wheel outwardly supporting each wing section frame bar, a draw pole for the implement connected to said braced unit, draft members pivotally connected forwardly to the drawpole and rearwardly connected to the wing section frame bars intermediate the ends of said frame bars and being detachable therefrom, and a transverse frame carried forwardly on the drawpole on which the outer ends of the wing section frame bars may be supported when said wing sections are pivoted forwardly in relation to the center section.

2. A rotary rod weeder as set forth in claim 1, wherein upright standards are connected to the frame bars movable in respective vertical planes about pivot axes perpendicular to the towing direction, rotary rods mounted in said standards, said standards comprising two parallel spaced shanks, and flexible couplings connecting rod sections associated with respective frame bars, and driving means carried by said braced unit connected in driving relation to the rotary rods associated with the center frame section.

3. A rotary rod weeder as set out in claim 1 wherein the standards include forwardly elongated apertures in which the rods are received freely for rotation about the rod axis and for movement lengthwise of and perpendicularly to the aperture length, and including half-bearings defining the rearward margin of said apertures.

4. A rotary rod weeder as set out in claim 1 in which the front and rear bars of the center frame section extend laterally in opposite directions from their parallel portions, and the ground wheels for said center frame section are mounted on the said extending portions, and the inward ground-penetrating ends of the rotary rods underlying said center frame section terminate at positions which are in longitudinal alignment.

5. A rotary rod weeder as set out in claim 1, further comprising means for elevating or depressing said ground wheels with respect to said frame sections to cause the lower ends of said standards and said rod sections to be lifted clear of the land or to be adjustably embedded therein.

6. A rotary rod weeder as set forth in claim 4 wherein said means for elevating or depressing said ground wheels comprises a shaft mounted lengthwise of each section frame bar free to rotate about an axis parallel with the frame bar axis, couplings connecting the inner ends of the wing section shafts to the outer ends of the center section shafts with the wing section shafts free to pivot vertically and horizontally, an arm fixed to each of the center section shafts projecting radially thereof, a hydraulic motor means anchored to the draw bar, and linkage means connecting said motor means to the arms on said shafts for simultaneously turning said shafts in the same direction.

7. In a rotary rod weeder as set out in claim 5, means mounting the center section frame bars and the wing section frame bars on their supporting wheels to be adjustably elevated or depressed relatively to said ground wheels, comprising an axle journalling each of said wheels, a pipe fixed at right angles to said axle, means pivotally connecting said pipe by an end for swinging about a horizontal axis in the frame, and an arm fixed to each center and wing section shaft connected with said pipe by a pivoting link.

8. A rotary rod weeder as set out in claim 2 wherein the weeding rod carried by each wing frame bar is sectioned in lengths such that a flexible coupling is disposed between a pair of standards under a universal coupling joint for said wing frame bar for folding together with said wing frame bar, and an outer terminal rod section which is journalled in two adjacent standards engaging said rod section intermediate its ends is joined by another flexible coupling to an intermediate rod section.

References Cited
UNITED STATES PATENTS

| | | | |
|---|---|---|---|
| 1,784,362 | 12/1930 | Largent | 172—44 |
| 1,815,331 | 7/1931 | Robinson | 172—44 |
| 2,725,006 | 11/1955 | Richmond | 172—44 |
| 3,190,367 | 6/1965 | Kopaska | 172—456 |

FOREIGN PATENTS

| | | |
|---|---|---|
| 230,279 | 6/1960 | Australia. |

ABRAHAM G. STONE, *Primary Examiner.*

WILLIAM A. SMITH, *Examiner.*

J. R. OAKS, *Assistant Examiner.*